United States Patent
Wendt et al.

(10) Patent No.: US 11,153,714 B2
(45) Date of Patent: Oct. 19, 2021

(54) BEACON VERIFICATION DEVICE

(71) Applicant: SIGNIFY HOLDING B.V., Eindhoven (NL)

(72) Inventors: Matthias Wendt, Würselen (DE); Peter Deixler, Arlington, MA (US); Harald Josef Günther Radermacher, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/323,424

(22) PCT Filed: Jul. 24, 2017

(86) PCT No.: PCT/EP2017/068629
§ 371 (c)(1),
(2) Date: Feb. 5, 2019

(87) PCT Pub. No.: WO2018/024527
PCT Pub. Date: Feb. 8, 2018

(65) Prior Publication Data
US 2020/0196093 A1    Jun. 18, 2020

(30) Foreign Application Priority Data
Aug. 5, 2016 (EP) .................. 16182996

(51) Int. Cl.
*H04W 4/02* (2018.01)
*H04W 4/029* (2018.01)
(Continued)

(52) U.S. Cl.
CPC ........... *H04W 4/023* (2013.01); *G01S 1/024* (2013.01); *G01S 11/06* (2013.01); *H04W 4/029* (2018.02); *H04W 4/80* (2018.02); *H04W 64/003* (2013.01)

(58) Field of Classification Search
None
See application file for complete search history.

(56) References Cited

U.S. PATENT DOCUMENTS

| | | | |
|---|---|---|---|
| 2006/0087474 A1* | 4/2006 | Do | G01S 1/024 342/386 |
| 2009/0204354 A1* | 8/2009 | Davis | H04W 84/18 702/89 |

(Continued)

FOREIGN PATENT DOCUMENTS

| | | |
|---|---|---|
| DE | 102014217504 B4 | 9/2017 |
| EP | 0542509 A2 | 5/1993 |

OTHER PUBLICATIONS

Damien Kubrak, et al., "Multi-Sensor Fusion for Localization Concept and Simulation Results," 22nd International Meeting of the Satellite Division of the Institute of Navigation, Sep. 2009 (11 Pages).

*Primary Examiner* — Ernest G Tacsik

(57) ABSTRACT

An electronic verification system is provided, comprising: (I) multiple electronic verification devices (120), comprising: —a beacon receiver (124) arranged to receive localizing beacon signals transmitted from multiple beacons (110) installed in the vicinity of the multiple verification devices, the verification device transmits the beacon message to an external beacon verification computer, and (II) the beacon verification computer (130) configured to analyze the multiple beacon messages to determine if a localization system comprising the multiple beacons is functioning correctly.

14 Claims, 14 Drawing Sheets

(51) Int. Cl.
  *H04W 4/80* (2018.01)
  *G01S 1/02* (2010.01)
  *G01S 11/06* (2006.01)
  *H04W 64/00* (2009.01)

(56) References Cited

U.S. PATENT DOCUMENTS

| | | | |
|---|---|---|---|
| 2014/0071853 A1 | 3/2014 | Ohashi et al. | |
| 2015/0334569 A1 | 11/2015 | Rangarajan et al. | |
| 2015/0334676 A1* | 11/2015 | Hart | H04W 64/003 455/456.1 |
| 2016/0125319 A1* | 5/2016 | Morgan | H04W 4/80 705/5 |
| 2016/0330825 A1* | 11/2016 | Recker | H05B 45/20 |
| 2017/0069153 A1* | 3/2017 | Teicher | G01S 5/0252 |
| 2017/0269186 A1* | 9/2017 | Sharma | G01S 1/70 |
| 2018/0143286 A1* | 5/2018 | Ikezaki | G01S 5/021 |
| 2018/0249306 A1* | 8/2018 | Pandharipande | H04W 4/33 |
| 2018/0266397 A1* | 9/2018 | Ristau | G01S 1/68 |
| 2019/0036722 A1* | 1/2019 | Singamsetty | H04L 12/282 |

\* cited by examiner

| 120.1 | | 120.2 |

| 110.1 | | | 110.2 |

| | | | 120.3 |
| 110.4 | 110.3 | |

FIG. 1c

| 120.1 | | 120.2 |

| 110.c | | 110.b |

| | | 120.3 |
| | 110.a | |

FIG. 1d

| Information about beacon reception | | | | | |
|---|---|---|---|---|---|
| Lighting device | | Est. distance in m | | Distance category | |
| Device | Device class | Beacon B5 | Beacon C5 | Cat B5 | Cat C5 |
| S36701 | Flip switch | 0,2 | 3,5 | immediate | far |
| L36701 | Luminaire/troffer 2x2 | 0,3 | 3 | immediate | far |
| L36702 | Luminaire/troffer 2x2 | 0,3 | 4 | immediate | far |
| S36702 | Flip switch | 0,3 | 3,7 | immediate | far |
| L36453 | Luminaire/downlight | 1 | 3,5 | near | far |
| L36452 | Luminaire/downlight | 1,4 | 4,5 | near | far |
| L36454 | Luminaire/downlight | 1,6 | 2,5 | near | far |
| L36708 | Luminaire/troffer 2x2 | 1,9 | 3,5 | near | far |
| L36704 | Luminaire/troffer 2x2 | 2 | 4,4 | near | far |
| L36602 | Luminaire/troffer 2x2 | 2,2 | 1,4 | far | near |
| L36455 | Luminaire/downlight | 2,5 | 1,7 | far | near |
| S36602 | Flip switch | 2,5 | 1,1 | far | near |
| S36601 | Flip switch | 2,6 | 0,9 | far | near |
| L36604 | Luminaire/troffer 2x2 | 2,8 | 2,3 | far | far |
| L36601 | Luminaire/troffer 2x2 | 3,2 | 0,5 | far | immediate |
| P36601 | Presence detector | 3,2 | 1,4 | far | near |
| L36456 | Luminaire/downlight | 3,6 | 1 | far | near |
| L36608 | Luminaire/troffer 2x2 | 3,7 | 1,9 | far | near |
| S36404 | Flip switch | 4 | 1,8 | far | near |

FIG. 4b

BEACON VERIFICATION DEVICE

CROSS-REFERENCE TO PRIOR APPLICATIONS

This application is the U.S. National Phase application under 35 U.S.C. § 371 of International Application No. PCT/EP2017/068629, filed on Jul. 24, 2017, which claims the benefit of European Patent Application No. 16182996.5, filed on Aug. 5, 2016. These applications are hereby incorporated by reference herein.

FIELD OF THE INVENTION

The invention relates to a building automation system, a beacon verification device, a building automation device, a beacon verification method, a computer readable medium.

BACKGROUND

Location based services are increasingly used. For outdoor applications, such as maps and navigation on a mobile phone, the current location of the mobile phone is used to provide the service. For example, outdoors application may use a GPS receiver to obtain coordinates.

Also indoors, there is an increasing desire to have localization information available, e.g., on mobile devices such as mobile phones. The indoor localization can be used for applications ranging, e.g., from indoor navigation to provide contextual services. For example, in a museum an application may provide context specific information depending on the current location of the mobile device; for example, the information may relate to a painting that is currently close to the device. For example, in a shop an application may provide information depending on the current location of the mobile device; for example, the information may relate to merchandise that is close to the current location of the mobile device.

One way to provide indoor localization is to use a localization system comprising multiple beacons. A beacon is an electronic transmitter placed at a known location, which transmits a periodic radio signal with limited information content, e.g. its identification or location. Beacons provide a low-powered, low-cost transmitter that can help nearby devices determine their location. There are several types of beacons available, based on a number of wireless transmission technologies, e.g., Wi-Fi, ZigBee and Bluetooth. In particular, a beacon may use Bluetooth Low Energy (BLE), also known as Bluetooth 4.0 or Bluetooth Smart. Often beacons get installed in fixed grid to give good location coverage over the whole space.

Modern so called "Beacon" technology allows mobile devices and apps running on these to learn about their position on a micro-local scale. Nowadays more and more beacons are used to give mobile devices fine grain indoor location information like room coordinates. For example, in some localization systems, a beacon may be installed for each office, with multiple beacons for large open plan offices, corridors and the like. The reception of localization signals transmitted by the beacons allows only an approximate distance to be computed between a beacon and a beacon receiver. This means that if only a few or even only a single beacon is malfunctioning the localization power of the localization system may be significantly impaired, especially for regions in the building around the malfunctioning beacon.

However, beacons typically operating alone and are battery powered which means that occasionally they have to be serviced. Typically, as beacons are not part of a network there is no central monitoring of all beacons in the space. Unfortunately, whereas a failing luminaire maybe spotted and reported by a user, a failing beacon will be much harder for a user to notice, if possible at all. The user may only notice a worsening localization system.

SUMMARY OF THE INVENTION

Building automation systems and beacon verification devices are provided that address the above problem and/or other problems as set out herein.

The building automation system according to claim 1 comprises multiple building automation devices which are adapted so that they can be used to verify the beacon based localization system. The building automation devices report the beacons that are received at that building automation device to a beacon verification device. Because the beacon verification device receives information of the reception of the beacon from multiple different building automation devices, the beacon verification device is in a position to analyze the localization system using this information, and determine if the localization system is functioning correctly.

There are several aspects of the correct functioning of the localization system that the beacon verification device can verify. For example, in an embodiment, the beacon verification device is arranged to determine if a beacon of the multiple beacons is malfunctioning. In an embodiment, the beacon verification device is configured to estimate a location for the beacon corresponding to the beacon identifier. Having a beacon location can be used for a variety of purposes, ranging from using said locations to start a localization service, verifying the correct placement of the beacons, and even verifying a correct transition of beacon identifiers to new beacon identifiers.

In an embodiment, the beacon verification device is configured to compute a similarity measure between beacon reception at a first and second building automation device. If the beacon reception at two places is similar, then the localization system has problems telling the corresponding locations apart. For some applications it is desirable that the localization system has a good resolution. By verifying that at least building automation devices can be distinguished a minimum quality is ensured. Moreover, the locations of the building automation devices typically correspond to the locations where activities tend to occur, and thus where localization are apt to be used. The beacon verification device can generate an error signal if it determines that the similarity measure passes a threshold. The beacon verification device does not necessarily need to use all beacon automation devices for this verification, but may use a subset. For example, the subset may be taken at locations where good resolution of the localization is particularly important. For example, the subset may be taken to be distributed evenly over the building. For example, in an embodiment, a single luminaire per room is selected to verify that the localization system can distinguish different rooms.

The building automation devices can be many different kinds of devices that are installed in buildings. For example, the building automation devices may be HVAC devices. In a preferred embodiment, the building automation system is a connected lighting system. For example, the building automation system may be luminaires, etc. The building automation system may comprise additional building automation devices beyond the multiple building automation devices which do not sent beacon messages.

In an embodiment, the building automation system comprises a control computer. The computer is a central computer to control the devices. For example, a control computer may turn luminaires, HVAC devices, on or off e.g. as dictated by appropriate rules. Such a control computer is not necessary for a connected building automation device. For example, the intelligence, e.g., said rules, of a connected lighting system may be in the switches and luminaires. For example, a luminaire may be configured to turn itself on if it receives an appropriate message from a wall switch. If a control computer is used, then the beacon verification device may cooperate with it, e.g., to communicate with the building automation device and receive the beacon messages. For example, the beacon verification device and the control computer may be combined in a single device, e.g., a control computer that also acts as a beacon verification device. However, this is not necessary, beacon verification functionality and control functionality may be split over two independent devices: a beacon verification device and a control computer. It is noted, that if no control computer is used, a beacon verification device may still be present. For example, the beacon verification device may temporarily or permanently be attached to the network that connects the building automation system together.

The beacons, building automation devices, beacon verification device and control computer are electronic devices. The beacon verification device may be a mobile electronic device, e.g., a smart phone or tablet, but may also be a server, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a building automation system, FIG. 1b schematically shows an example of an embodiment of a building automation system, FIG. 1c schematically shows an example of an embodiment of a building automation system, FIG. 1d schematically shows an example of an embodiment of a building automation system, FIG. 1e schematically shows an example of an embodiment of a building automation system, FIG. 2a schematically shows an example of an embodiment of an office light plan, FIG. 2b schematically shows a detail of FIG. 2a, FIG. 3 schematically shows an example of an embodiment of a library in a perspective view, FIG. 4a schematically shows a detail of FIG. 2a, FIG. 4b schematically shows an example of an embodiment of a beacon reception report, FIG. 5a schematically shows an example of an embodiment of computing a similarity measure, FIG. 5b schematically shows an example of an embodiment of computing a similarity measure, FIG. 5c schematically shows an example of an embodiment of computing a similarity measure, FIG. 6a schematically shows an example of an embodiment of beacon verification method, FIG. 6b schematically shows an example of an embodiment of beacon verification method, FIG. 7a schematically shows a computer readable medium having a writable part comprising a computer program according to an embodiment, FIG. 7b schematically shows a representation of a processor system according to an embodiment, FIG. 8 schematically shows a verification system for a beacon based localization system installed in a street lighting system, FIG. 9 schematically shows an example of an embodiment of a luminaire and LED.

LIST OF REFERENCE NUMERALS, IN FIGS. 1A-1E 100 a building automation system
110 a beacon
110.1-110.4 a beacon
110.a-110.c a beacon
112 a radio circuit
114 a beacon memory
120 an electronic building automation device
120.1-120.3 an electronic building automation device
122 a communication interface
124 a beacon receiver
126 a beacon identifier memory
128 a processor circuit
130 a control computer
132 a communication interface
134 a processor circuit
130' a beacon verification computer
132' a communication interface
134' a processor circuit
140 a localization system
145 a digital network

DETAILED DESCRIPTION OF PREFERRED EMBODIMENTS

Figure 1A:
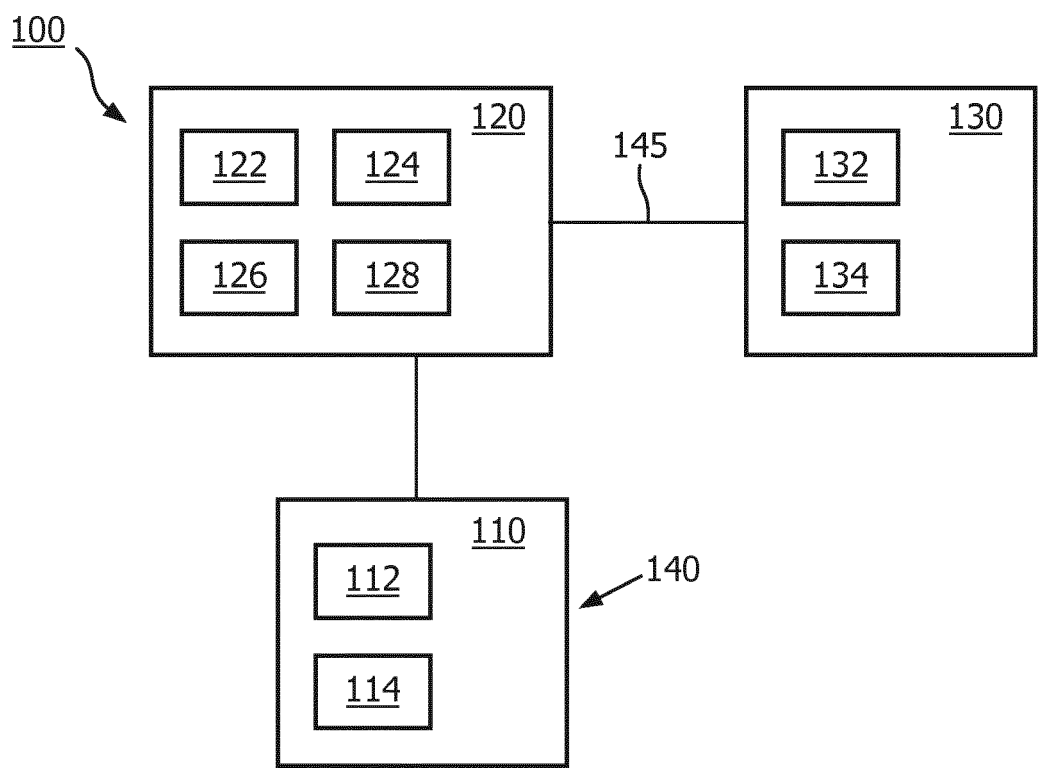

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

In the figures below the invention is explained with reference to a building automation system. The inventors had the insight that many building automation devices, e.g., luminaires, switches, heating, ventilation, air conditioning device, etc., may have their functionality extended to act as a verification device for a beacon based localization system. For example, a luminaire, say, as part of a connected lighting network, may also verify a localization system in the building.

Figure 8:
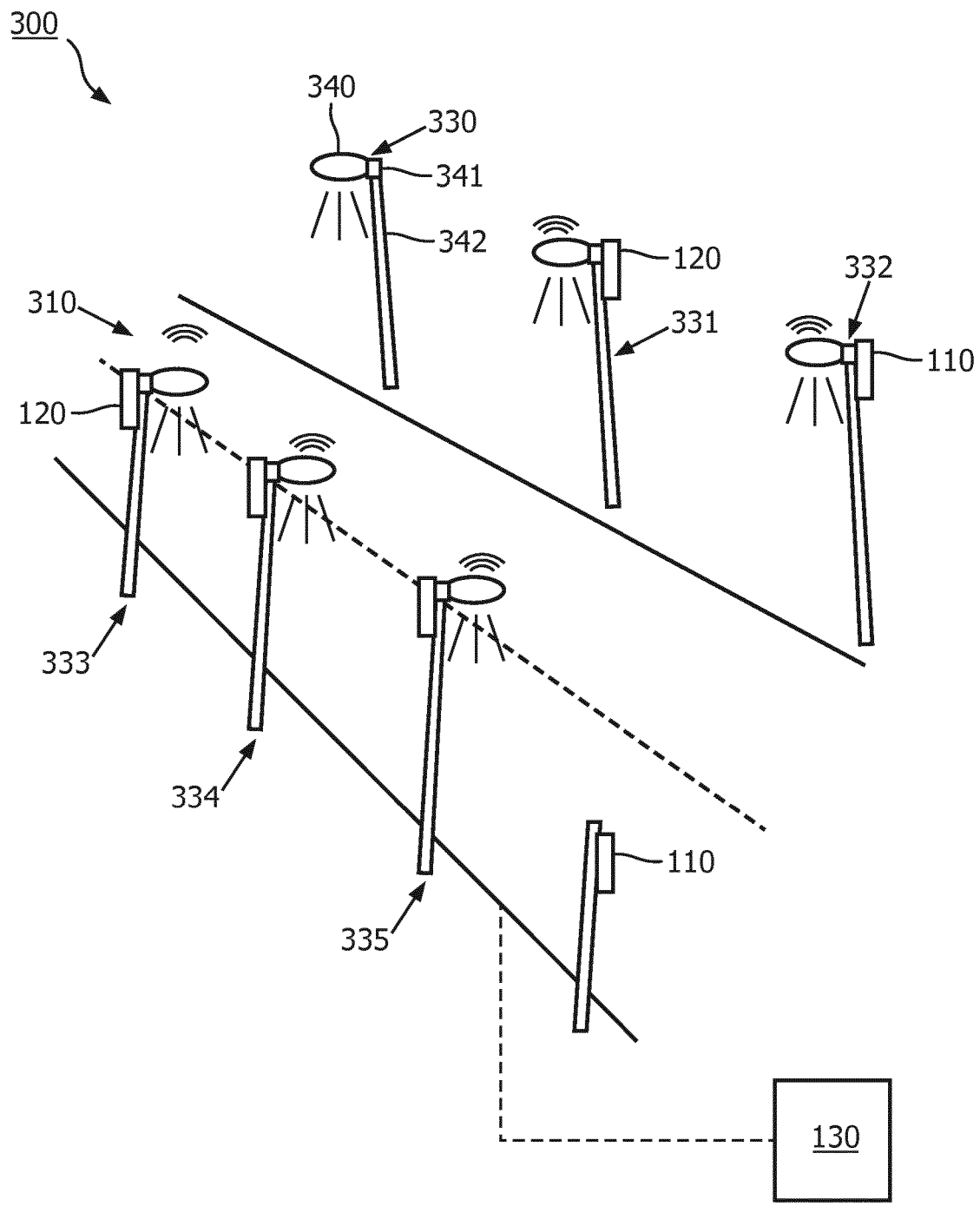

The inventors also realized that a verification system for beacon based localization systems also have independent appeal outside the context of buildings. For example, FIG. 8 shows an embodiment in which the verification devices are not building automation devices but are installed in street lights. The street light may provide power and network connectivity to the verification device. The embodiments below focus mainly on the important embodiment of building automation devices, but such embodiments may be easily modified. For example, a building automation device may be turned in a general verification device by stripping the building automation device functionality from it.

FIG. 1a schematically shows an example of an embodiment of an electronic building automation system 100. System 100 comprises multiple electronic building automation devices. One building automation device 120 is shown. System 100 further comprises a control computer 130. Control computer 130 and the building automation device are connected via a digital network. Control computer 130 controls the building automation devices.

FIG. 1a further shows a localization system 140. Localization system 140 comprises multiple beacons. One beacon 110 is shown, the other beacons follow the same or a similar design. For example, the beacons may be distributed around a building.

Beacon 110 comprises a beacon memory 114. Beacon memory 114 is arranged to store a beacon identifier. In an embodiment, the beacon identifier is unique for localization system 140. Beacon 110 comprises a radio circuit 112. Radio circuit 112 is arranged to transmit a wireless localizing beacon signal. The wireless localizing beacon signal comprises the beacon identifier stored in beacon memory 112. Beacon 110 is arranged to periodically repeat the localization signal. Beacon 110 may comprise a processor circuit configured to generate the localization signal and to periodically repeat transmission of the localization signal over radio circuit 112. Radio circuit 112 may comprise an antenna.

Beacon based localization system 140 allows a device with a beacon receiver, e.g., a mobile phone, to obtain its position on a small scale. Beacon based localization system 140 is in particular suited where GPS reception is poor, e.g., indoors. The indoor location may be used, e.g., to deliver contextual content to users based on location. For example, information what is at a specific location may be obtained separately as a wireless service as requested by a mobile app. A localization system may be the backbone for many location-based services.

Beacons may be based on different types of wireless technology. For example, beacons 110 may be a Bluetooth, Zig-Bee, or Wi-Fi beacon. In an embodiment, beacon 110 uses Bluetooth Low Energy. Other possible beacon types include BLE, Wi-Fi, WiMax, cellular triangulation or LoRa (e.g. for street lighting). The received beacons may be a mixture of different type beacons. The accuracy and beacon density may vary between different technologies.

Beacons typically operate alone and may be battery powered which means they have to be serviced every couple of years. Typically, beacons are not part of a network, and are not able to send push-messages to receiving devices. Neither are beacons equipped for collecting user data or for storing these. In an embodiment, a beacon solely sends information about its identity. The beacon identifier distinguishes the beacons in localization system 140 from each other. For example, registering all existing beacons in a building cannot be done centrally using traditional technology; obtaining a list of all existing beacons requires moving a beacon receiving device throughout the building by service personnel to map all beacon identifiers.

Often beacons are installed in a grid to give good location coverage over the whole space. Advantageously, beacons are placed in the ceiling. With this placement they are located with a good line of sight which is beneficial for reception coverage.

In further developed embodiments, beacon receivers are positioned at different heights to obtain increased resolution. Beacon receivers at different heights may be used to localize a beacon receiver in three dimensions. In a yet further developed embodiment, a beacon receiver comprises a directive antenna. A directive antenna allows determining a direction from which a beacon signal came. Having a direction in addition to a signal strength allows obtaining a more accurate position.

In an embodiment, a localization signal comprises a constant preamble followed by the beacon identifier. The beacon identifier may be a UUID (Universally Unique Identifier), and a Major and Minor value. For example, the UUID may be 16 bytes long, Major and Minor are each 2 bytes long. Together these form an ID for the beacon. In an embodiment, the UUID is the same for all beacons in the same localization system 140, while the Major and Minor values vary for each beacon. A localization signal may further comprise a signal power value. For example, it may represent the RSSI value (Received Signal Strength Indication) measured at 1 meter from the beacon. The value of this value may be used in calculating a location from received signal strengths. The signal power value of the beacon may be known at the control computer. For example, the control computer may comprise a table associating beacon identifier to signal power value. The signal power value may be the same for all beacons in localization network 140.

The range of the localization signal of a beacon depends on the transmission power of the beacon. This may be the same for all beacons, or may be set differently for some beacons. Note that reception of a beacon localization signal depends on environmental factors. The localization signal is repeated each time period. The time period may be set smaller if frequent updates in localization are needed, e.g., if the localized object moves quickly. More frequent repeats of the localization signal use more power. For example, a repeat interval may be set between, e.g., 100 ms and 1 second, e.g., 200 ms.

Building automation device 120 comprises a communication interface 122 arranged to communicate with control computer 130 over a digital network 145. Digital network 145 may comprise a wired network, e.g., an Ethernet network, e.g. using one or more power over Ethernet connections (PoE). Digital network 145 may comprise a wireless network, e.g., a Wi-Fi or ZigBee network. Digital network 145 may combine wired and wireless technologies.

Building automation device 120 comprises a beacon receiver 124 arranged to receive localizing beacon signals transmitted from multiple beacons installed in the vicinity of the building automation device. From the received localizing beacon signals an estimate of the location of building automation device 120 may be computed. It is not necessary that all building automation devices in building automation system 100 comprise a beacon receiver 124.

Computing a location from received localizing beacon signals may be done in a variety of ways. For example, in a simple embodiment, one may simply conclude that the building automation device 120 is not too far removed from the beacons that it can receive, e.g., it is within range. In a more advanced embodiment, the intersection of the ranges of the received beacons may be determined, and it can be concluded that building automation device 120 is located in or near the intersection. Building automation device 120 comprises a beacon identifier memory 126 for storing beacon identifiers received by the beacon receiver in a time period. For example, device 120 may comprise a processor circuit configured for storing a received beacon identifier in beacon identifier memory 126.

In an embodiment, the beacon identifiers that are received in the localization signals are stored in the beacon identifier memory 126. In an embodiment, beacon identifier memory 126 is last in last out, e.g., a queue. For example, the beacon identifier memory 126 may be sized to store the last 100 beacon identifiers. In a smaller embodiment, beacon identifier memory 126 may keep only the last 4 beacon identifiers. In a more advanced embodiment, processor circuit 128 is configured to store for each received beacon identifier the time at which it was last received. In an embodiment, the time period for which information on beacon identifiers is kept may be limited to a specific value, e.g., to a few seconds, a minute, etc. For example, the latter may be implemented by discarding all beacon identifiers that were received more than the time interval ago.

In an embodiment, device 120 does not receive or process the localization signals continuously, e.g., to reduce power use, or bandwidth, or to reduce complexity. For example, device 120 may be configured to store beacon identifier only during a time interval of a specific length, e.g., a minute, a second, etc. This may be repeated, say, once or a few times a day.

Better estimates of location can be made by recording the received signal strength of the localization signal. In an embodiment, beacon receiver 124 is arranged to measure the signal strength of the localization signal. Processor circuit 128 is arranged to store a signal strength indication with the beacon identifiers in the beacon identifier memory. The signal strength indication indicates the signal strength with which the localization signal was received at beacon receiver 124. Optionally, processor circuit 128 is arranged to also store a signal power value received in the localization signal. The signal power value may be used with the signal strength indication in estimating a distance between the beacon receiver 124 and the beacon. The signal power value may also be used to verify that the settings of the beacons have not changed without authorization. The signal strength indication and optionally the signal power value may be communicated to control computer 130.

In an embodiment, a beacon receiver may be arranged to report a signal strength indication, e.g., RSSI. From the signal strength indication an estimated distance to the beacon may be computed. In an embodiment, the estimated distance may be rounded to categories, e.g., unknown, immediate below 50 cm, near up to 2 m and far up to 30 m.

Processor circuit 128 is arranged to generate a message comprising beacon identifiers stored in the beacon identifier memory, and to transmit the message to control computer 130 over the digital network. The message may also include a signal strength indication, e.g., for each received beacon identifier. The received signal strength indication may, e.g., be expressed in decibels. For example, control computer 130 may comprise a communication interface 132 arranged to communicate with the building automation devices 120 over digital network 145. Control computer 130 comprises a processor circuit 134 configured to process the received messages.

From the information on the received beacon identifier, and possibly the signal strength indication, and known locations of the beacons, a location of the beacon receiver can be estimated using various algorithms known in the art. For example, a trilateral estimation may be used, comprising estimated the distance between the beacon receiver and at least 3 beacons using the received signal strength. An example is given in the paper "Algorithms for Location Estimation Based on RSSI Sampling", by Papamanthou et al.

In an embodiment, building automation device 120 is a luminaire. In an embodiment, building automation device 120 is any one of the following group: a heating device, a ventilation device, an air conditioning device, a speaker, an automated air valve, a fire detector, a sensor, a wall switch. For example, the control computer may a back-end of a building automation system (BAS) or building management system (BMS).

Figure 2A:
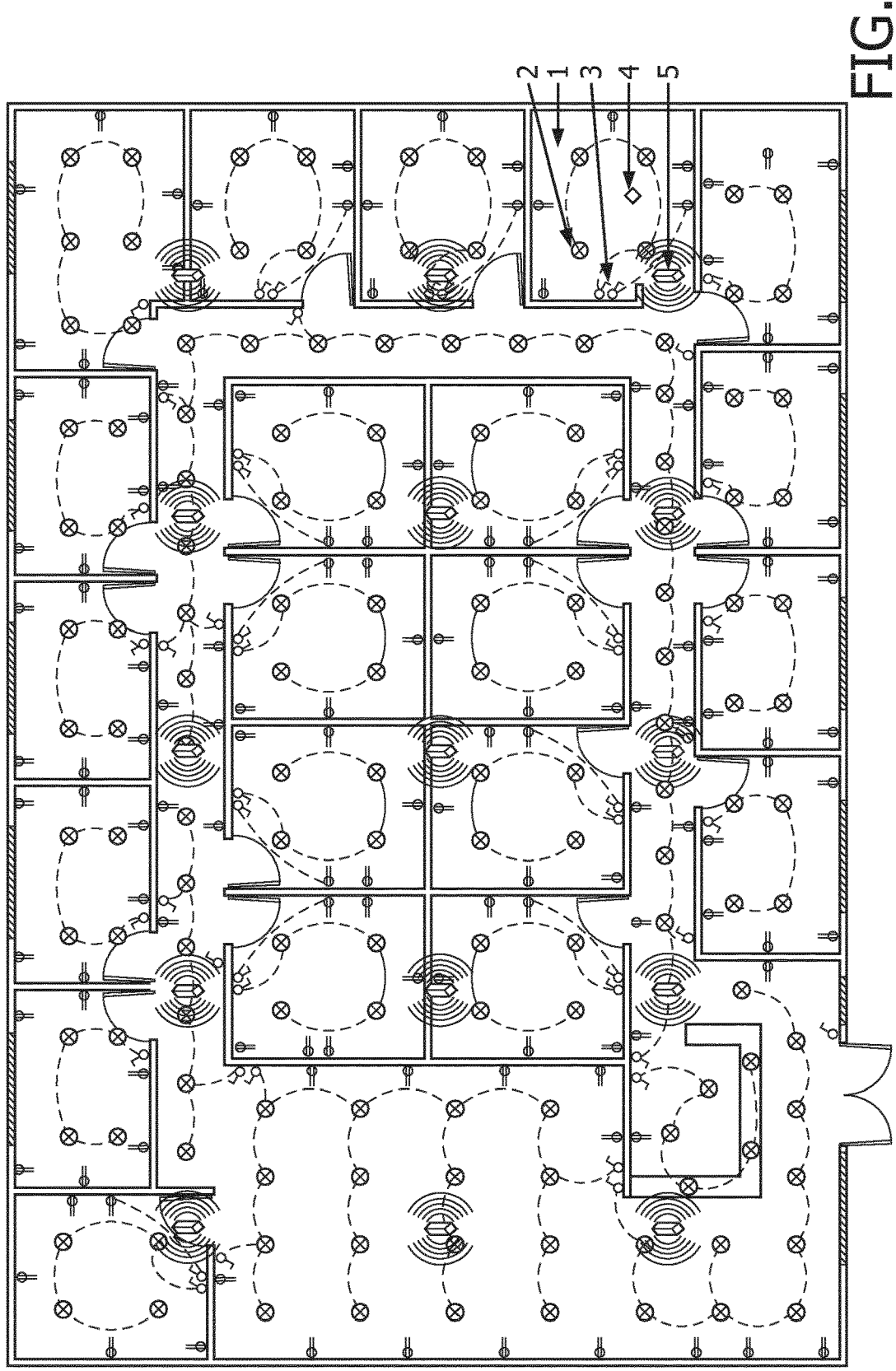
Figure 2B:
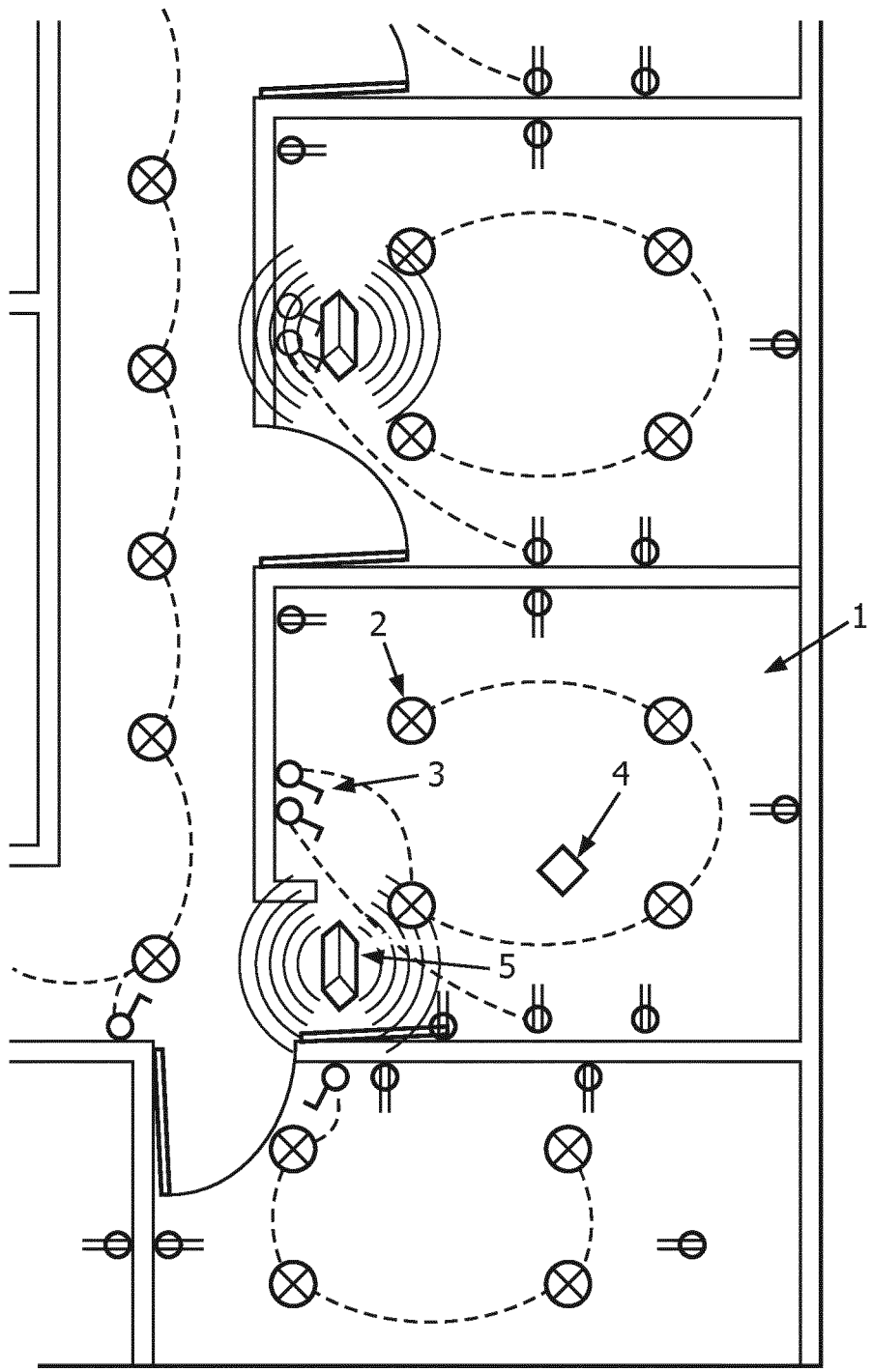

FIG. 2a schematically shows an example of an embodiment of an office light plan. FIG. 2b schematically shows a detail of FIG. 2a. A connected lighting system is an example of a building automation system. Shown in FIGS. 2a and 2b are beacons 5, arranged in a grid. For example, the lighting plan shown in FIG. 2a may be an office space comprising a number of office rooms 1. In the office room 1, a group of lamps 2 are controlled by manual switches 3 and/or sensors 4. In embodiment, one or more of the assets like sensors 4, manual controls 3 and light sources 2 comprise a beacon receiver as shown in FIG. 1a. The connected lighting system of FIG. 2a comprises a control computer, which is not shown in FIG. 2a.

In an embodiment, sensor 4 is an occupancy sensor arranged to determine occupancy of an area surrounding the occupancy sensor. For example, the occupancy sensor may be an infrared sensor, or a movement sensor, etc. For example, the occupancy sensor is arranged to generate an occupancy signal if the occupancy sensor detects occupancy or no occupancy of an area surrounding the occupancy sensor. The occupancy signal may be used to control the luminaires 2. This may be done directly, e.g., by a local network of a local network, or via the control computer. For example, processor circuit 134 of control computer 130 may be configured to determine from one or more occupancy sensors an occupancy status of an area surrounding the luminaire 2, e.g., office 1. If control computer 130 determines that office 1 is occupied, then control computer may send a control message to the luminaires 2 to switch them on. Possibly, the decision to turn a luminaire on may be more complicated and also involve day light sensors, and (wall) switches or other local controls, etc.

Figure 3:
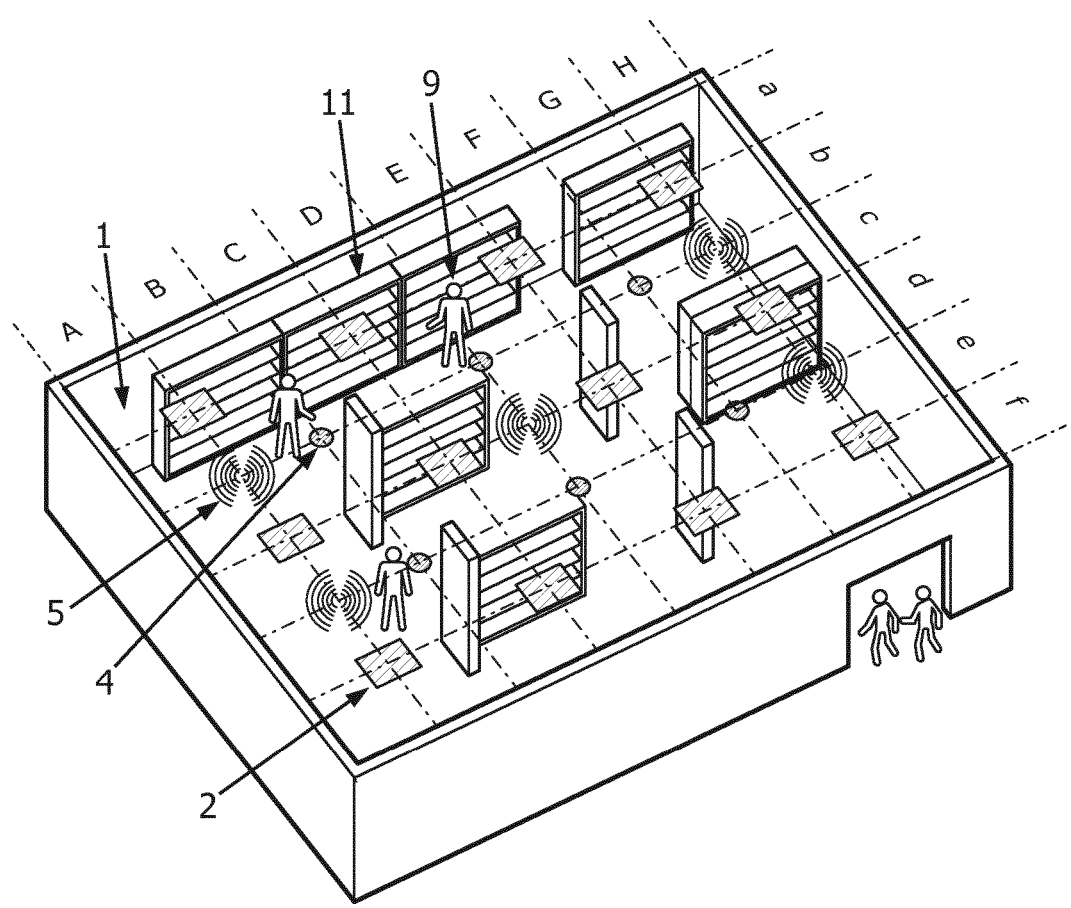

FIG. 3 schematically shows an example of an embodiment of a library in a perspective view. Here beacon technology is used to support people searching for specific books by means of multiple beacons 5 installed in the ceiling distributed over the space. FIG. 3 shows a room 1 with a grid of light sources 2 in the ceiling and five beacons 5. People 9 are moving around and are supported to reach a shelf 11 where a certain book is located. For example, a mobile phone of people 9 may comprise a beacon receiver to determine a location in the library. Using the location of the mobile phone a signal may be computed to guide the people in the correct direction. For example, the signal could be a map in which the desired location and the current location of the mobile phone are indicated. Similar applications are in shops, storing spaces or magazines.

Figure 4A:
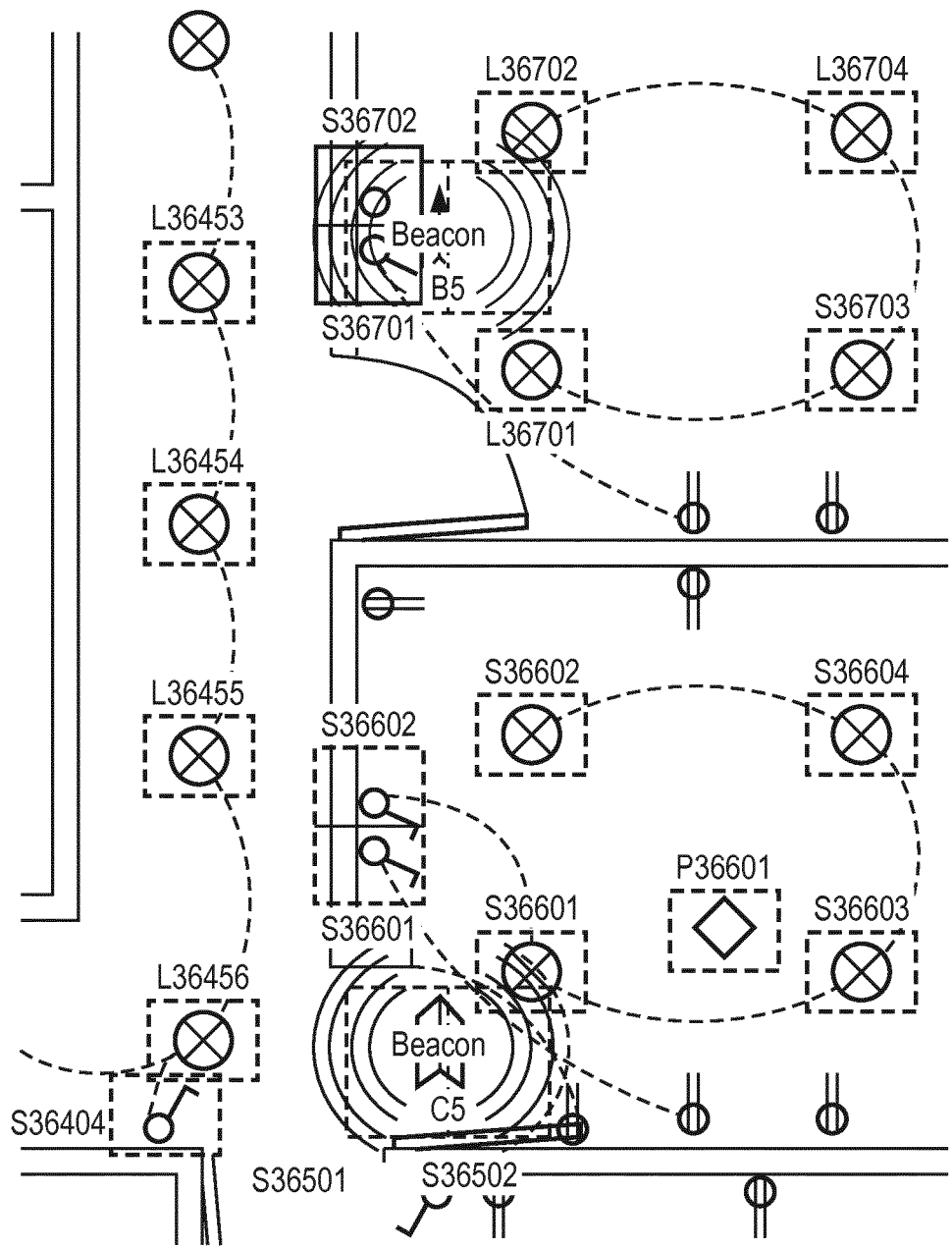

FIG. 4a schematically shows a detail of FIG. 2a. Shown in FIG. 4a are identifiers of the assets in the building automation system, in this case a connected lighting system. Also shown are two beacons: B5 and C5. The assets are configured to send a message to control computer 130 with the received beacon identifiers and the corresponding signal strength indications. FIG. 4b schematically shows an example of an embodiment of a beacon reception report. Shown in FIG. 4b is a table with 6 columns: the identifier of the device in the lighting system, a device class, e.g., a device type, device model, etc., estimated distances to beacons B5 and C5, and estimated distance categories to beacons B5 and C5. The estimated distance to a beacon is often subject to a lot of noise, e.g., due to environment interference. In some applications the distance category is about as accurate as the estimate distance. For example, presence detector (occupancy sensor) P36601 is far from beacon B5 but close to beacon C5.

Returning to FIG. 1a. Communication interface 132 of control computer 130 is arranged to communicate with the multiple electronic building automation devices over a digital network. For example, FIG. 1a shows control computer communication with building automation device 120 over a computer network 145. Control computer 130 receives beacon messages comprising beacon identifiers from multiple building automation devices. For example, building automation device 120 may be arranged to send a list of received beacon identifiers. In an embodiment, building automation device 120 also reports the corresponding received signal strengths and possibly also the corresponding signal power value reported in the localization signals. For example, the building automation devices may be configured to send a beacon message periodically, say, daily, or hourly etc. The timing of sending the beacon message may be randomized to avoid peaks in network bandwidth.

The processor circuit 134 of control computer 130 is configured to analyze the multiple beacon messages to determine if localization system 140 comprising the multiple beacons is functioning correctly. There are a number of aspects that control computer 130 can verify in a number of ways. For example, control computer 130 can verify the correct operation of the beacons themselves. For example, control computer 130 can detect if beacons disappeared, reduced in transmitting power, etc. Another aspect that control computer 130 can verify is verifying if the localization system implemented by the multiple beacons is operating correctly. For example, control computer 130 can verify if parts of the building have bad reception or bad localization. Examples of analyzing the multiple beacon messages are given below.

As pointed out above, building automation system 100 may be a connected lighting network; For example, building automation device 120 may be a luminaire. For example, building automation system 100 may be a HVAC system; For example, building automation device 120 may be an air-conditioning device.

In this embodiment, control computer 130 is arranged to control the multiple building automation devices, but also acts as a beacon verification computer. This is convenient, but not necessary. In FIG. 1c, an embodiment is described in which the analyzing of beacon messages is performed on a separate beacon verification computer 130'.

In the examples, we will identify beacon ID with the figure references for simplicity. In practice, the beacon IDs may be multiple byte numbers. In an embodiment, control computer 130 may collect all beacon messages that are received in a time period, say in a day, and verify if all known beacon ids, say from a list of known beacon IDs are all in the beacon messages. The list of known beacon IDs may, e.g., be installed in control computer 130, e.g., by an installer of localization system 140. The list of known beacon IDs may also be used to perform localization functions. For example, the list of known beacon IDs may also comprise known locations and optionally known signal strength values.

Figure 1B:
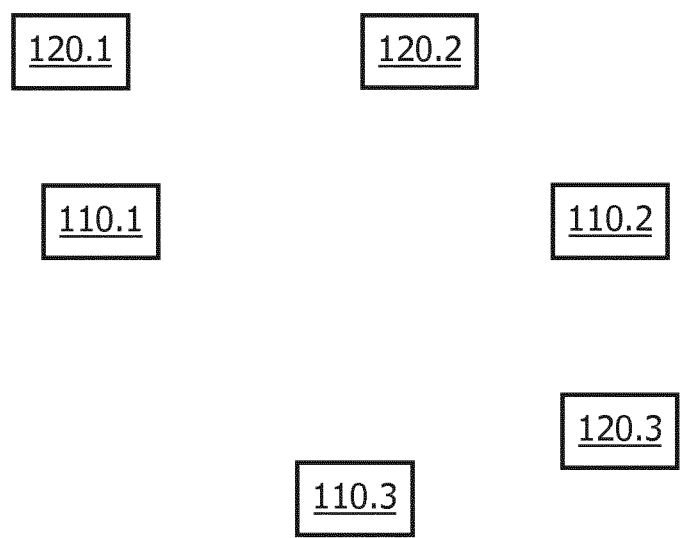

For example, FIG. 1b shows a floor in a building using connected lighting system 100 and localization system 140. Shown are 3 beacons 110.1, 110.2, and 110.3, and 3 building automation devices 120.1, 120.2, 120.3, say luminaires. For example, in a first verification period, control computer 130 receives the following beacon messages: (messages are represented in human readable pseudocode, and may comprise additional elements, e.g., to support the data communication protocol).

From device 120.1: received 110.1,
From device 120.2: received 110.1, 110.2
From device 120.3: received 110.2, 110.3

Control computer 130 comprises a list of known beacon IDs. For example, the known list may comprise {110.1, 110.2, 110.3}. Control computer 130 can verify for each known beacon ID in the known list if it occurs in a received beacon message. In this case, this is the case.

In a second verification period, control computer 130 may receive the following beacon messages:
From device 120.1: received 110.1,
From device 120.2: received 110.2
From device 120.3: received 110.2, 110.3

In this case, it happens that building automation device 120.2 is near the edge where beacon 110.1 can be received. However, all known Ids can still be found in the collected beacon messages, and so there is no problem.

In a third verification period, control computer 130 may receive the following beacon messages:
From device 120.1: received 110.1,
From device 120.2: received 110.1,
From device 120.3: received 110.3

In this case, known beacon ID 110.2 is not found in any of the received beacon messages. Control computer 130 may conclude that there is likely a problem with beacon 110.2. Control computer may generate an error signal, say an email, a problem report, etc., to alert maintenance of the problem. The error signal may comprise the missing beacon id, e.g., 110.2.

To ease computation control computer 130 could first generate a list of beacon identifiers comprised in the collective beacon messages. For example, in the third verification period, control computer may generate the list of received beacon identifiers as {110.1, 110.3} and next compare the list of known beacons IDs with the list of received beacon IDs.

In an embodiment, the list of known beacon IDs is built from the received beacon messages. For example, in a first verification period. Control computer 130 receives the following beacon messages
From device 120.1: received 110.1,
From device 120.2: received 110.1, 110.2
From device 120.3: received 110.2, 110.3

From these beacon messages, control computer generates a list of known beacon IDs, e.g., each beacon ID that occurs at least once in the list. In this case the generated list of known beacon IDs is {110.1, 110.2, 110.3}. After receiving the messages in the second and third verification period as above, the system can detect a missing beacon in the third verification period as indicated above.

It may happen, both in cases in which the known list has been stored in the control computer 130, or when the known list has been generated by the control computer that a beacon is added to the localization system. For example, in FIG. 1c, a beacon 110.4 is added. For example, the beacon message received from building automation system 120.1 may include 110.4. This may point to an unauthorized beacon. Again control computer 130 may flag this problem, in an error signal, etc.

Returning to FIG. 1b. The building automation devices may be further arranged to store a signal strength indication with the beacon identifiers in the beacon identifier memory, the beacon message comprising the beacon identifiers and a signal strength indication.

In an embodiment, control computer 130 produces a known list of beacon identifiers comprising the beacon identifiers received from the multiple building automation devices in a first set of beacon messages during a first time period, the beacon verification computer comprising a beacon memory configured to store the known list of beacon identifiers.

For example, in a first verification period. Control computer 130 receives the following beacon messages
From device 120.1: received 110.1 with RSSI S11
From device 120.2: received 110.1 with RSSI S21, 110.2 with RSSI S22
From device 120.3: received 110.2 with RSSI S32, 110.3 with RSSI S33

Control computer 130 may produce the following list from this information: Known beacons:
110.1 received by 120.1 with RSSI S11; received by 120.2 with RSSI S21,
110.2 received device by 120.2 with RSSI S22, received by 120.3 with RSSI S32
110.3 received device by 120.3 with RSSI S33

If in a second time period, say a next day, one of the beacons in the known beacons is not received an error signal can be generated as before. If a beacon is received but with a smaller received signal strength indication, then this may point to an error. In an embodiment, a threshold is used to determine if a received signal strength indication is smaller, e.g., at least a predetermined number of dBm, or a predetermined percentage smaller.

Signal strength may be reduced for reasons unrelated to the beacon, e.g., moved furniture may cause a reduction in signal strength. To reduce the number of false positives, in an embodiment, the received signal strength must be reduced for multiple building automation devices, say at least 2, at least 3, etc. In an embodiment, it required, possibly in addition, that the beacon reception strengths reduced for the building automation device which had the best reception, e.g., in the immediate class. Note, that in these cases, the reduced signal strength may also lead to localization properties. These may be detected as well, e.g., in a manner disclosed herein.

The control computer need not store the received signal strength for all building automation devices. For example, control computer 130 may only store one, e.g., the strongest signal. For example, control computer 130 may produce the following list: Known beacons:
110.1 received by 120.1 with RSSI S11;
110.2 received device by 120.2 with RSSI S22,
110.3 received device by 120.3 with RSSI S33

For example, signal strength S21 of beacon 110.1 at building automation device 120.2 is much smaller than that received at building automation device 120.1. As a result, S21 is less reliable and may give false positives.

Verifying received signal strength may be combined with a stored list of beacon identifiers. For example, control computer 130 may store received signal strength together with a given list of registered beacon identifiers. Regular reporting about the beacon receivability may be offered as a service, as well as a warning service whenever a beacon reception vanishes.

Interestingly, the locations of the beacons can be estimated from known locations of the building automation device. In a sense, the localization properties of the localization system are used in reverse. Rather than using known locations of the beacons to estimate the locations of objects, the known location of building automation devices may be used to estimate locations of beacons.

In an embodiment, the beacon verification computer may comprise a building automation device memory comprising locations of multiple building automation devices. For example, these locations may be given in coordinates. These locations may be estimates themselves, in which case the precision of the system is reduced. It is not necessary that the location of all building automation devices are known, so long beacons are received at a sufficient number of building automation devices with known locations; say at least 3.

The processor circuit is configured to determine for a beacon identifier multiple signal strength indications reported by multiple building automation devices located at different locations. For example, the processor circuit may select beacon messages coming from different building automation devices. Next, the processor may estimate a location for the beacon corresponding to the beacon identifier from the multiple signal strength indications and the locations of the multiple building automation devices. For example, the processor circuit may use the same algorithms conventionally used to estimate location of a beacon receiver from its reception of multiple beacons.

Obtaining the locations of the beacons may be used for several purposes. For example, if a problem is detected with a beacon, e.g., as indicated above. Maintenance people may be sent to correct location, or least to approximately the correct location, e.g. to replace, e.g., a battery of the beacon. Obtaining the locations of the beacons may be used to start a localization service. For example, in an embodiment, a lighting system has been installed for which the locations of luminaires are known, e.g., indicated on a lighting plan. This information can be used to estimate the locations of the beacons. The initial estimation the locations of the beacons may be improved by showing the estimated locations on a map, e.g., displayed on display of the beacon verification device. A human operator can now easily move the beacons to their actual position. This is much faster than fully mapping out the locations of the beacons by hand. The beacon verification device may be a mobile device, e.g., a mobile phone, or tablet.

In FIG. 1d the beacon identifiers of the beacons have changed. This may be done to reduce risk of piggyback or spoofing. For example, the operator of the localization service may not want unauthorized access to his localization service. This may be achieved by regularly changing beacon identifiers so that only the authorized operator knows the true relationship between beacon identifier and beacon location. However, in this case it would be desirable to have a check on the mapping of the identifier.

Control computer 130 can perform this function using the estimated locations. For example, at some point, e.g., during a first time period control computer 130 estimates the locations of the beacons in the localization system and stores a first list of beacon identifiers and estimated locations.

For example, for the system shown in FIG. 1b this list may be as follows. (We assume that additional building automation devices, not shown in FIG. 1b may be used to estimate the location of the beacons)

| Beacon | Estimated Location |
|--------|-------------------|
| 110.1  | L1                |
| 110.2  | L2                |
| 110.3  | L3                |

Later, say in a second time period, after the beacon identifiers changed, control computer 130 again estimates the location of the beacons thus obtaining a second list of beacon identifiers and estimated locations. For example, in FIG. 1d the same system is shown but with different beacon identifiers. Control computer 130 may obtain the following list:

| Beacon | Estimated Location |
|--------|-------------------|
| 110.a  | L3                |
| 110.b  | L2                |
| 110.c  | L1                |

Control computer 130 may match the first and second list to find a mapping for the identifiers. For example, control computer 130 may determine a first beacon identifier in the first list, say beacon 110.1, and a different second identifier in the second list, say beacon 110.c, that are in the same estimated location, in this case in location L1. If this is done for all beacons, the following mapping is obtained

| Old Beacon ID | New Beacon ID |
|---------------|---------------|
| 110.1         | 110.c         |
| 110.2         | 110.b         |
| 110.3         | 110.a         |

If locations are known for the old beacon ID, then this mapping may be used by a localization service. The mapping may also be used to verify if the change of beacon ids was performed correctly.

In an embodiment, control computer 130 is configured to estimate the location of the beacons. This can be provided as a service to the beacon location service companies. So the beacon company may obtain complete documentation of al receivable beacons with accurate placement of the beacons in a building plan and a list of all beacon identifiers. This makes mapping of beacons an easy process which may be done remotely so no person needs to be present in the space and which can easily be repeated whenever beacons are changed.

In an embodiment, control computer 130 computes a dynamic localization error correction, e.g., per building space, e.g. per room. This dynamic localization error may be based on the available beacons in the space, as reported to the control computer. The beacon verification computer may calculate a measured localization accuracy for a given building space. This accuracy may be used in service business models to verify the Quality-of-Service of the localization system.

Figure 1E:
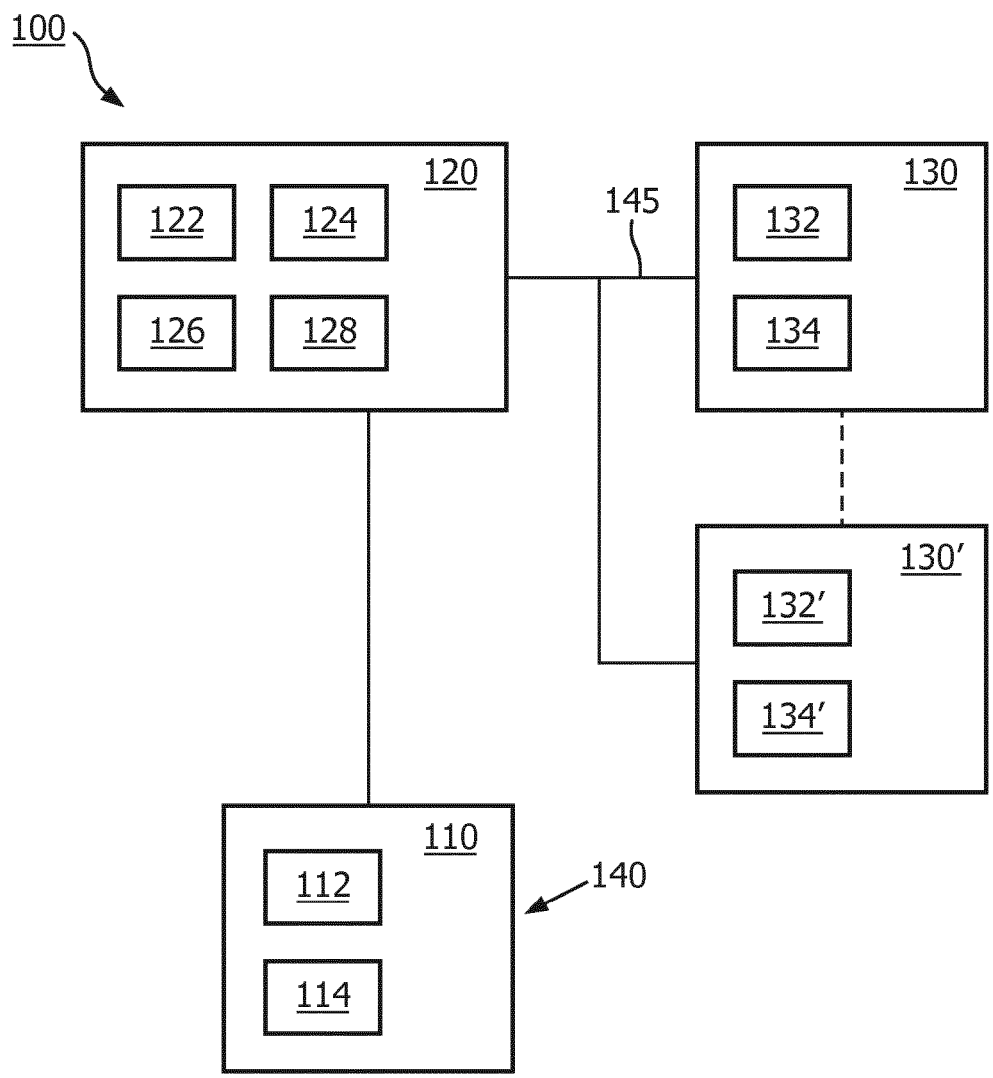

FIG. 1e schematically shows an example of an embodiment of a building automation system. In system 100, control computer 130 control the building automation system, but also acts as beacon verification computer. In FIG. 1e these two functions are split over two different computes, a control computer 130 and a beacon verification device 130'.

FIG. 1e shows a building automation system 100' that is similar to the system of FIG. 1a. The system 100' includes a separate beacon verification computer 130' comprising a communication interface 132' and a processor circuit 134'. Beacon verification computer 130' is arranged to receive the beacon messages comprising beacon identifiers from the multiple building automation devices. For example, beacon verification computer 130' may communicate directly with the building automation device, e.g., over computer network 145. For example, beacon verification computer 130' may communicate with control computer 130 and receive the beacon messages from control computer 130; for example, a building automation device may send a beacon message to control computer 130, say over network 145, and control computer may forward the beacon message to beacon verification computer 130'. The latter option is indication with a dashed line in FIG. 1e.

Control computer 130 may be limited to controlling the building automation system. For example, if the building automation system is a connected lighting network, then control computer 130 could control the switching on and off of luminaires in the building automation system.

Control computer 130 may also be used to verify the quality of localization. For example, control computer 130 may compute a similarity measure between beacon receptions at two building automation devices. If the similarity measure for the pair passes a threshold, e.g., if beacon reception is too similar, then the localization is not able to tell the locations of these two building automation device apart very well. This may be resolved by adding beacons and/or changing the locations of the beacons.

A similarity measure may be implemented in different ways. In an embodiment, the similarity measure represents the overlap between likely regions in which the two beacons are located.

Figure 5A:
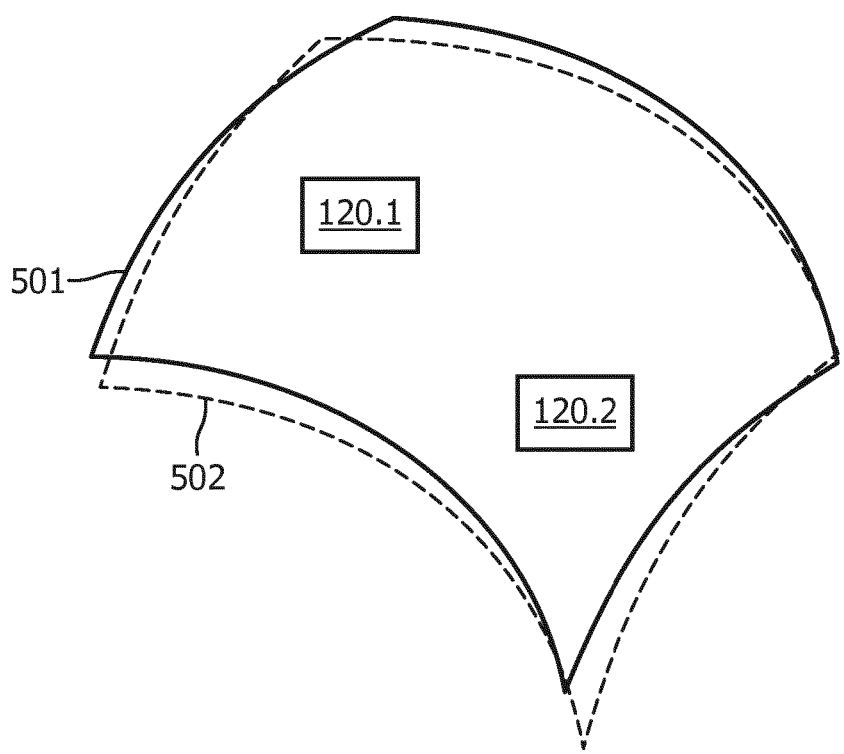

For example, consider FIG. 5a. Shown in FIG. 5a are two building automation devices 120.1 and 120.2. Devices 120.1 and 120.2 have reported to control computer 130 the beacons they can receive and the corresponding signal strength. It is noted that it is possible to compute a similarity measure without using signal strength, e.g. by computing the number of beacons that are received by exactly one of the two building automation devices.

Using the beacon reception as reported in the beacon message, the control computer computes a location for a number of the building automation devices, say for a subset or for each building automation devices. In this case, the location is expressed as a likely area in which the building automation device is located. There is an inherent imprecision of locating using a beacon network. In this case, for example, trilateral location may be used, where a lower and upper bound is computed for the distance between the received beacons and the building automation device. For each beacon, the lower and upper bound define a region in which the building automation device may be located. The intersection of the possible regions defines a likely area in which the building automation device is located.

It is noted that there are other ways to obtain a likely area. For example, more advanced location algorithms are available, e.g., probabilistic algorithms. In the latter case an area may be defined as a 95% percent likelihood region that comprises the building automation device with that probability (other percentages are possible, say, 90%, etc.). For example, if only an algorithm is available that produces a coordinate for the building automation device, then a (virtual) circle may be drawn around the building automation device with a radius that indicates the inherent imprecision of the technology used.

The similarity measure or two building devices may be indicative of the area of overlap between the estimated location regions for the two building automation devices.

Figure 5B:
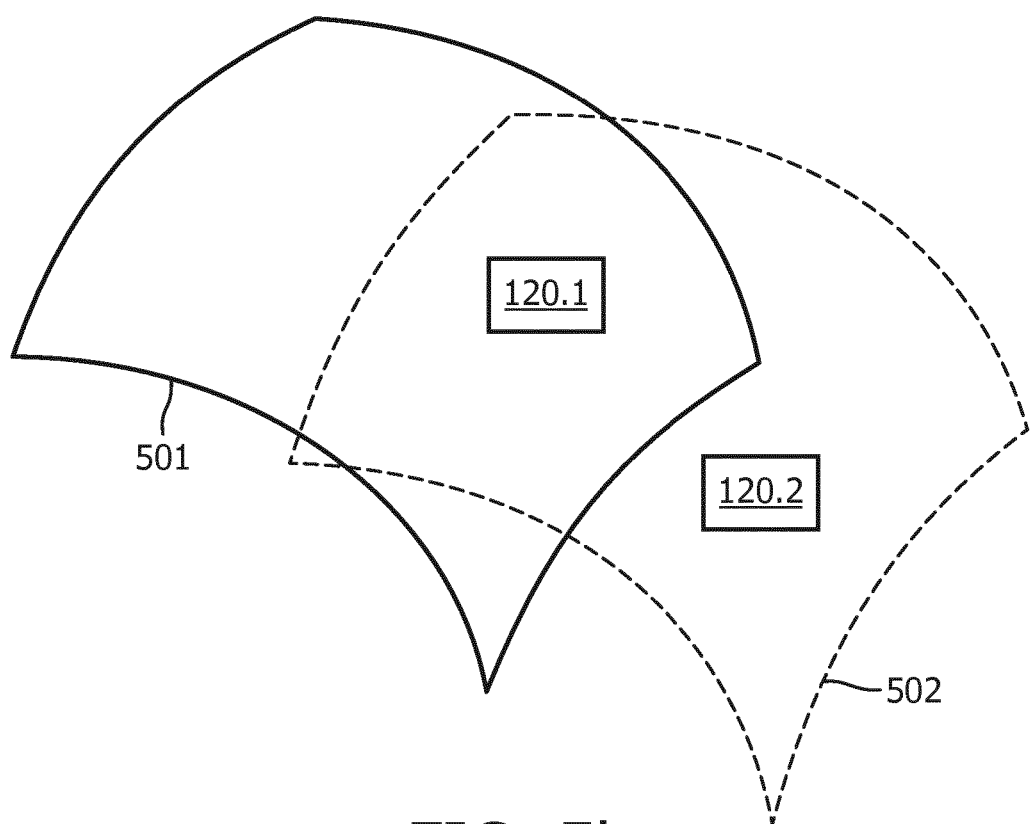
Figure 5C:
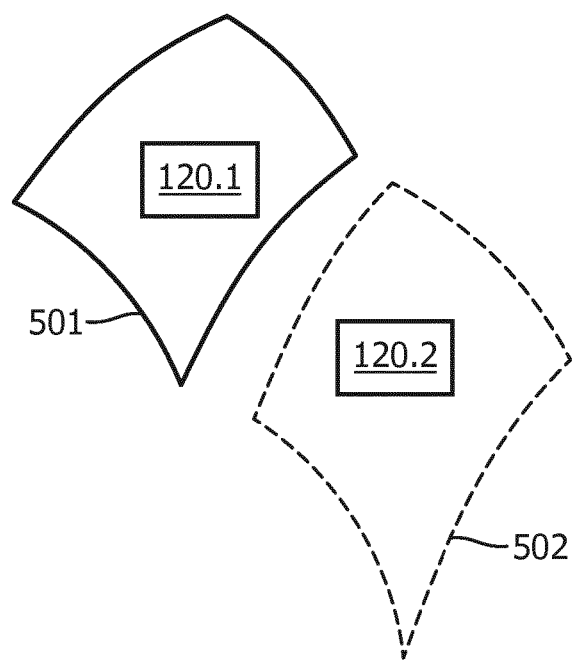

FIG. 5a shows the likely region 501 for building automation device 120.1, and a likely region 502 for building automation device 120.2. There is a large overlap between the two regions. This means that be location device does not distinguish between the location of building automation device 120.1 and 120.2. FIG. 5b shows a situation in which the similarity measure decreased. Although, there is still an overlap between the likely regions, the system apparently can see a difference between the two locations. Finally, in FIG. 5c the overlap reduced to zero. The location system can distinguish well between the locations of devices 120.1 and 120.2. In an embodiment, control computer 130 computes likely regions for building automation devices, say for a selected set that represent a number of locations in a building, and next compute for each pair of the selected set the overlap in their likely regions. For example, the chosen building automation devices may be distributed more or less evenly over a building.

There are other ways to compute a similarity measure. For example, a vector may be computed for the building automation devices that represent reception of the various beacons The similarity measure may compute the similarity between two vectors, e.g., their (mean) square error, e.g., the sum of the squared component-wise differences. In this case, a low square error indicates high similarity.

In an embodiment, processor circuit 134 of control computer 130 is configured to estimate beacon reception at a location different from the building automation devices from the beacon reception reported by the building automation devices. For example, the reception of a particular beacon reception at a particular location may be estimated by interpolating from beacon reception of the beacon at the building automation devices. Using the estimated beacon reception, the above analysis can also be done for locations that are not locations of building automation devices. For example, a number of location, say a grid, may be selected, for each location beacon reception is estimated. Using the estimated beacon reception similarity scores between pairs of locations may be computed.

In an embodiment, control computer 130 may be used to improve the localization system. For example, control computer 130 may suggest a new location for an existing beacon or a new location for an additional beacon. Using the beacon reception data, the beacon reception of a beacon at the new location may be estimated; for example, by using interpolation. For example, the interpolation may be polynomial interpolation, say, linear or quadratic, or higher degree interpolation. In this way the expected reception of a beacon at the new location may be computed. Using this expected reception new similarity measures, e.g., as indicated above may be computed. In the computation, reception for the new beacon is added, or one of the reception values is replaced, etc.

Once beacon reception of localization signals sent from the new beacon location at desired locations have been estimated, a similarity measure between the desired locations can be computed.

For example, processor 134 may be configured to iterate over different new locations e.g. for existing or for new beacons. In this way a beacon location can be selected that is expected to make good contribution to increasing the resolution of the localization system.

For example, a beacon supplier may first install the beacons at reasonable places. In a second phase use a lighting system to collect all receptions. The plan with all lighting devices and their identifiers is provided from the lighting system to the beacon provider together with the full reception list where the receivability and all reception categories for all lighting devices is listed, e.g., as shown in FIGS. 4a and 4b. A computer supported tool, e.g., a beacon verification device, may be used by a human to set the position of each beacon in the building plan, as indicated above.

In an implementation the list is computer based and highlights the lighting devices being in the category near and immediate by two different colors. For example, the tool may be interactive and provide details of receptions when clicking or pointing on a certain lighting device. This may also contain either a RF signal strength reading per beacon or a derived distance estimation.

For example, a beacon verification computer may select a building automation device, e.g., a luminaire, as a new beacon location. For example, the building automation device may be activated by a digital activation message transmitted to the building automation device, e.g., over the network. It could be that a building automation device uses less directional antennas than a dedicated beacon device, however if the dedicated beacon device is dead, using a beacon sent by a luminaire will be better than having no beacon at all.

In general, the communication interface may take various forms, such as a network interface to a local or wide area network, e.g., the Internet. The communication interface may be wired, e.g., an Ethernet interface, a PoE interface, etc. The communication interface may be wireless, e.g., Wi-Fi, ZigBee, etc.

Typically, the beacon verification device 130', control device 130, beacon 110, and building automation device 120 each comprise a microprocessor (not separately shown in FIGS. 1a-1e) which executes appropriate software stored at the devices; for example, that software may have been downloaded and/or stored in a corresponding memory, e.g., a volatile memory such as RAM or a non-volatile memory such as Flash (not separately shown). Alternatively, the devices may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

FIG. 8 schematically shows a street 310 with a street lighting system 300 in which one or more embodiments of the verification system are provided. Along the street there are lighting poles 330 . . . 335 which form the street lighting system 300. In this document, the term lighting pole refers to the pole itself together with the light fixture at the top of the pole and additional optional driving circuitries provided in the pole and/or in the light fixture at the top of the pole. For lighting pole 330 distinct elements have been indicated, namely the light fixture 340, a pole 342 and a construction element 341 at the top of the pole which comprises, for example, a driving circuitry for driving the lamp in the light fixture 340.

In the street a beacon based localization system is installed. For example, multiple beacons 110 may be installed in the vicinity. Some of the beacons may be part of the street lights. Some of the beacons may be independent devices. In FIG. 8, two beacons are shown: Street light 332 has been installed with a beacon, and an independent beacon without a streetlight is shown. The beacon based localization system may be used for a precision navigation system. For example, autonomous driving may be assisted by precision localization devices. The verification devices in the lighting poles, which are fixed unmovable assets, verify the proper functioning of the precision navigation system. In the example of FIG. 8, two verification devices 120 are shown: in streetlights 331 and 333. For example, the beacon receiver may be provided in the light fixture 340. Other elements of the verification device are, for example, provided in the element 341 that also comprises the driving circuitry of the lamp. The communication interface may be connected to a network via a wire or wireless connection for transmitting the beacon message to a beacon verification computer. The digital connection between verification devices and computer 130 has been indicated in FIG. 8 with a dashed line.

Figure 9:
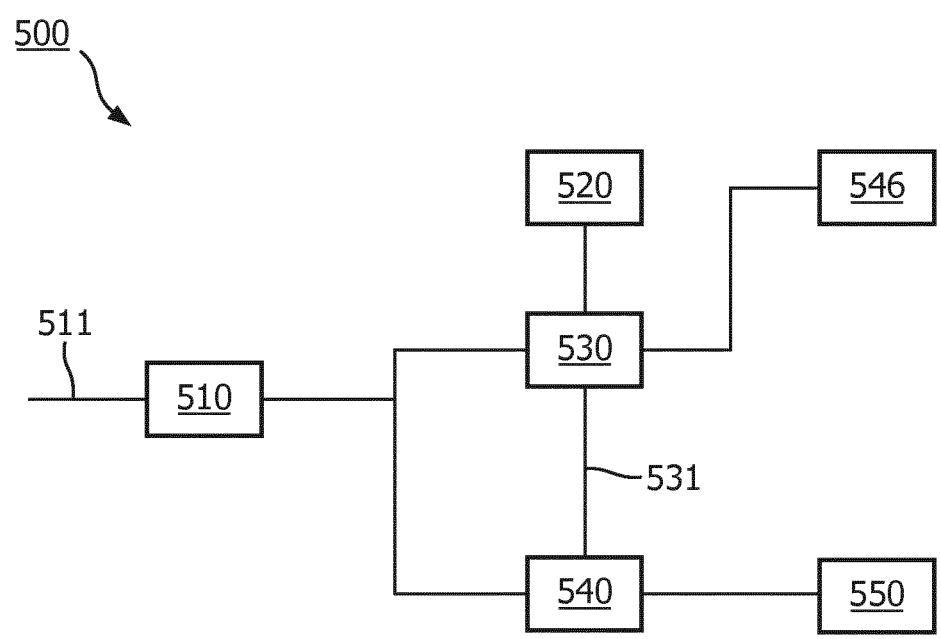

FIG. 9 schematically shows an example of an embodiment of a verification device, in this case a building automation device, in this case a luminaire 500 in which a LED 550 is installed. Luminaire 500 is an example of a building automation device.

Luminaire 500 comprise a powered device circuit 510. The powered device circuit 510 is arranged for Power over Ethernet. The powered device circuit 510 obtains electric power to drive luminaire 500 from a power over Ethernet connection 511. Powered device circuitry 510 is further arranged to provide access to a digital network, that connects luminaire 500 to a control computer. Luminaire 500 comprises a driver 540 driving a LED 550. Processor 530 controls driver 540 through a control connection 531. For example, processor 530 turns the LED on or off in dependence upon control signal received from control computer 130.

Luminaire 500 comprises a memory 520 and a processor circuit 530. Processor circuit 530 executes computer instructions stored in memory 520. Memory 520 may also be used as beacon memory.

Luminaire 500 comprises a beacon receiver 546. Processor circuit 530 is configure to generate a beacon message comprising beacon identifiers obtained from beacon receiver 546 and sends it to a control computer through powered device network connection 510.

Figure 6A:
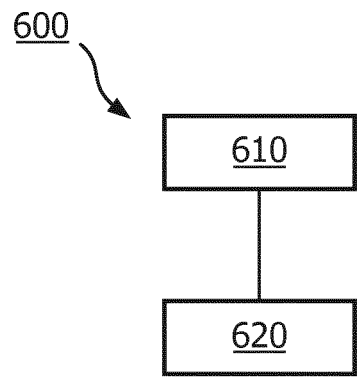

FIG. 6a schematically shows an example of an embodiment of beacon verification method 600. Beacon verification method 600 comprises:

receiving 610 beacon messages comprising beacon identifiers from multiple electronic building automation devices, multiple beacons 110 being installed in the vicinity of the multiple building automation devices, the beacon messages comprising beacon identifiers received by the building automation devices in localizing beacon signals transmitted from the multiple beacons and received at the building automation device, and analyzing 620 the multiple beacon messages to determine if the localization system comprising the multiple beacons is functioning correctly.

Figure 6B:
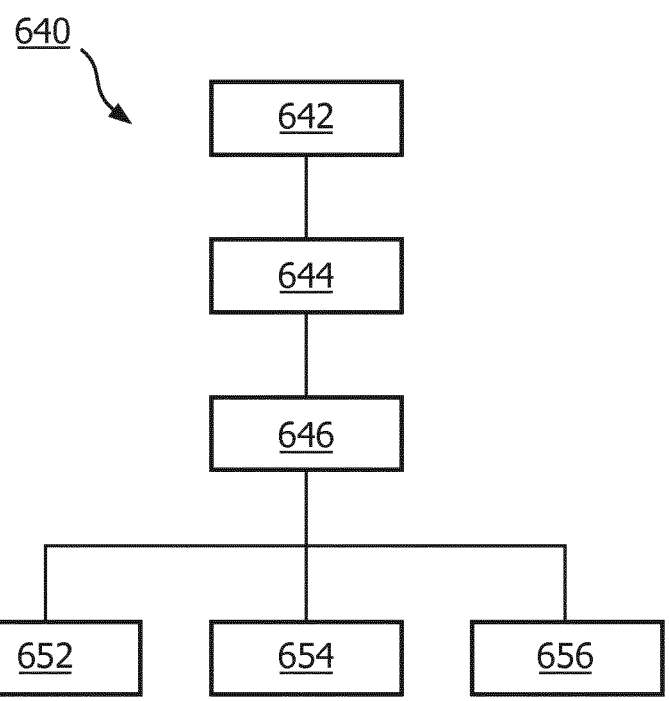

FIG. 6b schematically shows an example of an embodiment of beacon verification method 640. The method comprises:

receiving 642 beacon messages comprising beacon identifiers from the multiple building automation devices during a first period, obtaining a list of known beacon identifiers comprising the beacon identifiers of the multiple beacons installed in the building by compiling 644 the list of known beacon identifiers from beacon message received earlier from the multiple building automation device, the list of known beacon identifiers may include a signal strength indication with which a beacon identifier is received by at least one building automation device, the list of known beacon identifiers may be stored, e.g., in a storage, say in an electronic memory or a hard drive etc., of a beacon verification device, receiving 646 beacon messages comprising beacon identifiers from the multiple building automation devices during a second period, analyzing the multiple beacon messages received during the second period to determine if a localization system comprising the multiple beacons is functioning correctly, for example, method 640 may comprise any one of the following three:

determine 652 a beacon identifier in the list of known beacon identifiers that is absent from a set of beacon messages received from the multiple building automation devices, and/or determine 654 a beacon identifier in the set of beacon messages that is absent from the list of known beacon identifiers.

determine 656 that the beacon identifier in a beacon message from the at least one building automation device has a signal strength indication in the beacon message which is smaller than the signal strength indication in the known list.

For example, determining step 654 of 656 may be omitted in an embodiment.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 652, 654 and 656 may be executed, at least partially, in parallel. Moreover, a given step may not have finished completely before a next step is started.

A method according to the invention may be executed using software, which comprises instructions for causing a processor system to perform method 600 or 640. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet.

The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
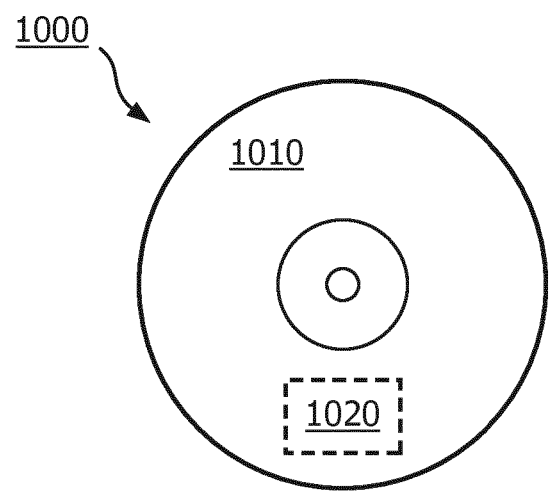

FIG. 7a shows a computer readable medium 1000 having a writable part 1010 comprising a computer program 1020, the computer program 1020 comprising instructions for causing a processor system to perform a beacon verification method or to implement a beacon verification device, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform the beacon verification method or to implement the beacon verification device.

Figure 7B:
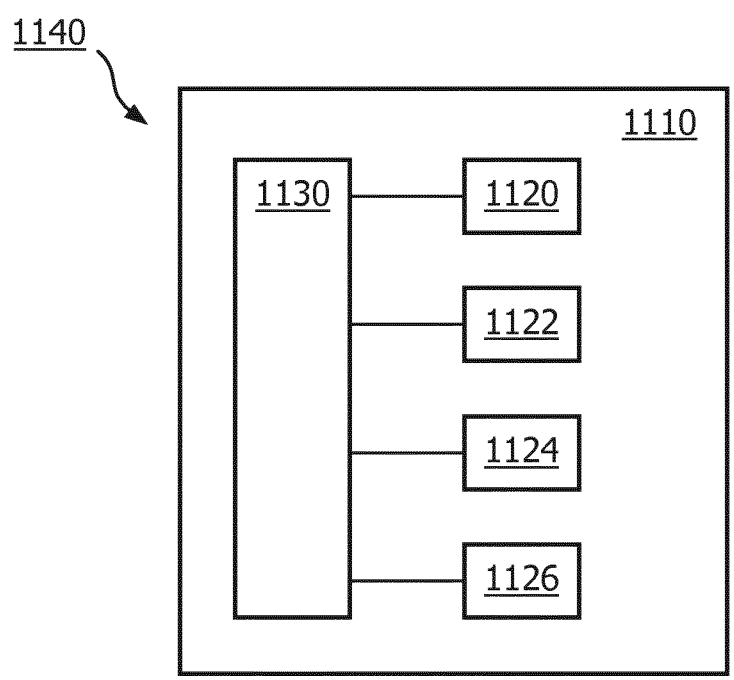

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the beacon verification device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory.

In the latter case, the verification device may comprise a non-volatile software interface, e.g., a hard drive, a network interface, etc., arranged for providing the software. The beacon and building automation devices may also comprise a processor. This could, e.g., be an ARM cortex M4 processor, etc.

The following clauses relates to various embodiments of the invention. The Applicant hereby gives notice that new claims may be formulated to such clauses and/or combinations of such clauses and/or features taken from the description, during prosecution of the present application or of any further application derived therefrom.

Clause 1. An electronic verification system for a beacon based localization system, comprising
(I) multiple electronic verification devices (120), comprising
  a communication interface (122) arranged to communicate with an external beacon verification computer (130),
  a beacon receiver (124) arranged to receive localizing beacon signals transmitted from multiple beacons (110) installed in the vicinity of the multiple verification devices, a localizing beacon signal comprising a beacon identifier identifying the beacon from which the localizing beacon signal originated,
  a beacon identifier memory (126) for storing beacon identifiers received by the beacon receiver, and
  a processor circuit (128) configured to
    generate a beacon message comprising the beacon identifiers stored in the beacon identifier memory,
    transmit the beacon message to the external beacon verification computer, and
(II) the beacon verification computer (130) comprising
  a communication interface (132) arranged to communicate with the multiple electronic verification devices, and receive beacon messages comprising beacon identifiers from multiple verification devices, and
  a processor circuit (134) configured to
    analyze the multiple beacon messages to determine if a localization system comprising the multiple beacons is functioning correctly.

Clause 2. An electronic building automation system as in claim 1, wherein the verification system is a building automation system, and wherein the verification devices are building automation devices.

Clause 3. An electronic building automation system as in claim 2,
  the building automation system is a connected lighting system, the multiple building automation devices including at least one or more luminaires, and/or
  the building automation system is a connected HVAC system, the multiple building automation devices including at least one or more heating, ventilation and/or air conditioning device.

Clause 4. A beacon verification computer, comprising
  a communication interface arranged to communicate with multiple electronic verification devices, and to receive beacon messages comprising beacon identifiers from the multiple verification devices, and
  a processor circuit configured to
    analyze the multiple beacon messages to determine if a localization system comprising the multiple beacons is functioning correctly.

Clause 5. A verification device (120), comprising
  a communication interface (122) arranged to communicate with an external beacon verification computer (130),
  a beacon receiver (124) arranged to receive localizing beacon signals transmitted from multiple beacons (110) installed in the vicinity of the multiple verification devices, a localizing beacon signal comprising a beacon identifier identifying the beacon from which the localizing beacon signal originated, a beacon identifier memory (126) for storing beacon identifiers received by the beacon receiver, and a processor circuit (128) configured to generate a beacon message comprising the beacon identifiers stored in the beacon identifier memory, transmit the beacon message to the external beacon verification computer.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic verification system for a localization system comprising multiple beacons, wherein the electronic verification system is a connected lighting system, the electronic verification system comprising:

a beacon verification computer; and multiple electronic verification devices, the multiple electronic verification devices including at least one or more luminaires, wherein each of the electronic verification devices comprises:

a communication interface arranged to communicate with the beacon verification computer, a beacon receiver arranged to receive localizing beacon signals transmitted from the multiple beacons, a given localizing beacon signal of said localizing beacon signals comprising a beacon identifier identifying the beacon from which the given localizing beacon signal originated, a beacon identifier memory for storing beacon identifiers received by the beacon receiver, and a processor circuit configured to generate a beacon message comprising the beacon identifiers stored in the beacon identifier memory, and transmit the beacon message comprising the beacon identifiers stored in the beacon identifier memory to the beacon verification computer, and the beacon verification computer comprising:

a communication interface arranged to communicate with the multiple electronic verification devices, and receive multiple beacon messages comprising beacon identifiers from the multiple electronic verification devices, and a computer processor circuit configured to analyze the multiple beacon messages by computing a similarity measure between beacon reception at first and second electronic verification devices of the multiple electronic verification devices and determining that the similarity measure passes a threshold, wherein passing said threshold indicates a higher degree of similarity than not passing said threshold, and wherein the computer processor circuit is configured to interpret the similarity measure passing the threshold as indicating that the localization system comprising the multiple beacons is functioning incorrectly, wherein functioning incorrectly indicates that locations of the first and second electronic verification devices are effectively indistinguishable by the localization system.

2. The electronic verification system of claim 1, wherein the electronic verification system is a street lighting system, and wherein the multiple electronic verification devices include a street light.

3. The electronic verification system of claim 1, wherein the beacon verification computer is a control computer arranged to control the multiple electronic verification devices.

4. The electronic verification system of claim 1, wherein the multiple electronic verification devices are further arranged to store a signal strength indication in the beacon identifier memory, wherein the beacon message comprising the beacon identifiers stored in the beacon identifier memory further comprises the signal strength indication.

5. A beacon verification computer, comprising:

a communication interface arranged to communicate with multiple electronic verification devices in a connected lighting system, the multiple electronic verification devices including at least one or more luminaires, and to receive multiple beacon messages comprising beacon identifiers from the multiple electronic verification devices, wherein each of the multiple electronic verification devices comprises:

a communication interface arranged to communicate with the beacon verification computer, a beacon receiver arranged to receive localizing beacon signals transmitted from multiple beacons of a localization system, a given localizing beacon signal of said localizing beacon signals comprising a beacon identifier identifying the beacon from which the given localizing beacon signal originated, a beacon identifier memory for storing beacon identifiers received by the beacon receiver, and a processor circuit configured to generate a beacon message comprising the beacon identifiers stored in the beacon identifier memory, and transmit the beacon message comprising the beacon identifiers stored in the beacon identifier memory to the beacon verification computer, and the beacon verification computer further comprising:

a computer processor circuit configured to analyze the multiple beacon messages by computing a similarity measure between beacon reception at first and second electronic verification devices of the multiple electronic verification devices and determining that the similarity measure passes a threshold, wherein passing said threshold indicates a higher degree of similarity than not passing said threshold, and wherein the computer processor circuit is configured to interpret the similarity measure passing the threshold as indicating that the localization system comprising the multiple beacons is functioning incorrectly, wherein functioning incorrectly indicates that locations of the first and second electronic verification devices are effectively indistinguishable by the localization system.

6. The beacon verification computer of claim 5, wherein the computer processor circuit is arranged to determine if a beacon of the multiple beacons is malfunctioning.

7. The beacon verification computer of claim 5, wherein the computer processor circuit is arranged to
obtain a list of known beacon identifiers of the multiple beacons installed in a building,
determine a beacon identifier in the list of known beacon identifiers that is absent from a set of beacon messages received from the multiple electronic verification devices, and/or
determine a beacon identifier in the set of beacon messages that is absent from the list of known beacon identifiers.

8. A beacon verification computer, comprising:
a communication interface arranged to communicate with multiple electronic verification devices in a connected lighting system, the multiple electronic verification devices including at least one or more luminaires, and to receive multiple beacon messages comprising beacon identifiers from the multiple electronic verification devices, wherein each of the multiple electronic verification devices comprises:
    a communication interface arranged to communicate with the beacon verification computer,
    a beacon receiver arranged to receive localizing beacon signals transmitted from multiple beacons of a localization system, a given localizing beacon signal of said localizing beacon signals comprising a beacon identifier identifying the beacon from which the given localizing beacon signal originated,
    a beacon identifier memory for storing beacon identifiers received by the beacon receiver, and
    a processor circuit configured to
        generate a beacon message comprising the beacon identifiers stored in the beacon identifier memory, and
        transmit the beacon message comprising the beacon identifiers stored in the beacon identifier memory to the beacon verification computer, and the beacon verification computer further comprising:
a computer processor circuit configured to
    analyze the multiple beacon messages to determine if the localization system comprising the multiple beacons is functioning incorrectly by computing a similarity measure between beacon reception at first and second electronic verification devices of the multiple electronic verification devices and determining that the similarity measure passes a threshold, wherein functioning incorrectly indicates that locations of the first and second electronic verification devices are effectively indistinguishable by the localization system,
    wherein the computer processor circuit is arranged to obtain a list of known beacon identifiers of the multiple beacons, which are installed in a building, wherein the list of known beacon identifiers further includes a signal strength indication correlated to a given beacon identifier received by at least one electronic verification device of the multiple electronic verification devices, and wherein the computer processor circuit is further arranged to
        determine that the given beacon identifier, which is in a given beacon message from the at least one electronic verification device, has a signal strength indication in the given beacon message which is smaller than the signal strength indication in the list of known beacon identifiers.

9. The beacon verification computer of claim 7, wherein the computer processor circuit of the beacon verification computer is configured to compile the list of known beacon identifiers from the multiple beacon messages received from the multiple electronic verification devices.

10. The beacon verification computer of claim 5, wherein the beacon message comprising the beacon identifiers stored in the beacon identifier memory further comprises a signal strength indication, the multiple electronic verification devices being arranged to store the signal strength indication in the beacon identifier memory, the beacon verification computer comprising:
a verification device memory comprising different locations of the multiple electronic verification devices,
the computer processor circuit being configured to
    determine for a given beacon identifier multiple signal strength indications reported by the multiple electronic verification devices located at the different locations,
    estimate a location for the beacon corresponding to the given beacon identifier from the multiple signal strength indications and the different locations of the multiple electronic verification devices.

11. The beacon verification computer of claim 10, wherein the computer processor circuit is configured to
store a first list of beacon identifiers and estimated locations,
repeat the estimating of the location for the beacon for a later time period and obtain a second list of beacon identifiers and estimated locations,
determine a first beacon identifier in the first list and a different second identifier in the second list that are in a same estimated location.

12. The beacon verification computer of claim 5, wherein the computer processor circuit is configured to
select a first new beacon location for a given beacon of the multiple beacons and/or add a second new beacon location for an additional beacon to be added to the multiple
estimate beacon reception of localization signals sent from the first and/or second new beacon location at two or more of the multiple electronic verification devices,
verify whether a corresponding similarity measure decreases between two electronic verification devices of the two or more of the multiple electronic verification devices.

13. A beacon verification method, comprising:
receiving beacon messages comprising beacon identifiers from multiple electronic verification devices, the beacon messages comprising beacon identifiers received by the multiple electronic verification devices in localizing beacon signals transmitted from multiple beacons of a localization system and received at the multiple electronic verification devices,
analyzing the beacon messages by computing a similarity measure between beacon reception at first and second electronic verification devices of the multiple electronic verification devices and determining that the similarity measure passes a threshold, wherein passing said threshold indicates a higher degree of similarity than not passing said threshold, and wherein the analyzing comprises interpreting the similarity measure passing the threshold as indicating that the localization system comprising the multiple beacons is functioning incorrectly, wherein functioning incorrectly indicates that locations of the first and second electronic verification devices are effectively indistinguishable by the localization system.

14. A non-transitory computer readable medium comprising instructions configured to cause a processor to perform the method according to claim 13 when the processor executes the instructions.

* * * * *